(12) United States Patent
Dupont De Dinechin et al.

(10) Patent No.: US 9,718,559 B2
(45) Date of Patent: Aug. 1, 2017

(54) PILOTING ASSISTANCE DEVICE CAPABLE OF DISPLAYING AN ANIMATION, AND ASSOCIATED METHOD

(71) Applicant: DASSAULT AVIATION, Paris (FR)

(72) Inventors: Sebastien Dupont De Dinechin, Aix en Provence (FR); Fabrice Vallete, Marseilles (FR)

(73) Assignee: DASSAULT AVIATION, Paris (FR)

( * ) Notice: Subject to any disclaimer, the term of this patent is extended or adjusted under 35 U.S.C. 154(b) by 0 days.

(21) Appl. No.: 14/269,504

(22) Filed: May 5, 2014

(65) Prior Publication Data

US 2014/0327699 A1 Nov. 6, 2014

(30) Foreign Application Priority Data

May 6, 2013 (FR) ...................... 13 01047

(51) Int. Cl.
| | |
|---|---|
| *G01C 21/00* | (2006.01) |
| *B64D 45/00* | (2006.01) |
| *G06T 19/00* | (2011.01) |
| *G06T 13/00* | (2011.01) |
| *G06F 3/147* | (2006.01) |
| *G09G 5/14* | (2006.01) |
| *G01C 23/00* | (2006.01) |

(52) U.S. Cl.
CPC ............ *B64D 45/00* (2013.01); *G01C 23/00* (2013.01); *G06F 3/147* (2013.01); *G06T 13/00* (2013.01); *G06T 19/006* (2013.01); *G09G 5/14* (2013.01); *G09G 2340/12* (2013.01); *G09G 2340/125* (2013.01); *G09G 2354/00* (2013.01); *G09G 2358/00* (2013.01); *G09G 2380/12* (2013.01)

(58) Field of Classification Search
None
See application file for complete search history.

(56) References Cited

U.S. PATENT DOCUMENTS

| | | | | |
|---|---|---|---|---|
| 4,786,905 | A * | 11/1988 | Muller | ......................... 340/975 |
| 5,051,094 | A * | 9/1991 | Richter et al. | ................... 434/30 |
| 5,751,576 | A * | 5/1998 | Monson | ......................... 700/83 |
| 6,121,899 | A * | 9/2000 | Theriault | ...................... 340/967 |
| 6,484,072 | B1 * | 11/2002 | Anderson et al. | ................ 701/9 |

(Continued)

OTHER PUBLICATIONS

"Garmin G500 Pilot's Guide", Aug. 5, 2011, p. 4.14, figure 4.15 accessed at http://static.garmincdn.com/pumac/190-01102-02_0D_web.pdf (on Nov. 28, 2013).

*Primary Examiner* — David H Chu (74) *Attorney, Agent, or Firm* — Davidson, Davidson & Kappel, LLC (57) ABSTRACT

A device is provided for assisting in the piloting of a vehicle, in particular an aircraft. The device includes a surface displaying images and a display management unit for images designed to be displayed on the display surface superimposed on a view of the outside landscape. The management unit is capable of commanding the display of piloting information images on the display surface. The management unit is capable of commanding the display, for at least one of the piloting information images, of an animation intended to attract a user's attention to that piloting information image, the animation comprising the display of an alert image and the shrinkage of the alert image.

16 Claims, 8 Drawing Sheets

(56) References Cited

U.S. PATENT DOCUMENTS

| | | | |
|---|---|---|---|
| 7,564,372 B1* | 7/2009 | Bailey et al. | 340/961 |
| 7,667,621 B2* | 2/2010 | Dias et al. | 340/963 |
| 7,974,773 B1* | 7/2011 | Krenz et al. | 701/120 |
| 7,995,096 B1* | 8/2011 | Cressy et al. | 348/153 |
| 8,742,952 B1* | 6/2014 | Bold | 340/980 |
| 9,251,715 B2* | 2/2016 | Hing | G02B 27/01 |
| 2002/0055809 A1* | 5/2002 | Westphal | 701/4 |
| 2003/0206119 A1* | 11/2003 | Riley | 340/963 |
| 2004/0186636 A1* | 9/2004 | Mendelson et al. | 701/9 |
| 2005/0049763 A1* | 3/2005 | Walsdorf et al. | 701/9 |
| 2006/0036476 A1* | 2/2006 | Klem | G06Q 10/06 705/28 |
| 2006/0284736 A1* | 12/2006 | Low | 340/980 |
| 2008/0191902 A1* | 8/2008 | Kolb | 340/945 |
| 2008/0208399 A1 | 8/2008 | Pham | |
| 2010/0023264 A1* | 1/2010 | G. | 701/301 |
| 2010/0251170 A1* | 9/2010 | Louch et al. | 715/810 |
| 2010/0309025 A1* | 12/2010 | Ganille et al. | 340/963 |
| 2011/0052042 A1* | 3/2011 | Ben Tzvi | 382/154 |
| 2011/0157222 A1 | 6/2011 | Morlec | |
| 2012/0008048 A1* | 1/2012 | Sekine et al. | 348/566 |
| 2014/0038138 A1* | 2/2014 | Swiderski | E02F 9/2008 434/69 |
| 2014/0074324 A1* | 3/2014 | Burgin et al. | 701/9 |

* cited by examiner

PILOTING ASSISTANCE DEVICE CAPABLE OF DISPLAYING AN ANIMATION, AND ASSOCIATED METHOD

This claims the benefit of French Patent Application FR 13 01047, filed May 6, 2013 and hereby incorporated by reference herein.

The present invention relates to a device for assisting in the piloting of a vehicle, in particular an aircraft, of the type comprising a surface displaying images and a display management unit for images designed to be displayed on the display surface superimposed on a view of the outside landscape, the management unit being capable of commanding the display of piloting information images on the display surface.

It will be noted that "view of the outside landscape" means that this view consists of a bundle of rays coming from the environment outside the aircraft and crossing through the display surface, or an image of the environment outside the aircraft, captured by a camera and displayed on the display surface.

BACKGROUND

Today, the piloting stations of vehicles, in particular aircraft, are equipped with multiple piloting assistance devices, designed to assist the pilot in driving the vehicle by displaying information relative to the speed and altitude of the vehicle, information relative to the operation of apparatuses onboard the vehicle, or information on the environment of the vehicle.

These piloting assistance devices commonly comprise "head up display" (HUD) devices, situated at eye level for the pilot and displaying information superimposed on a view of the outside environment through the piloting assistance device, and "head down devices" (HDD), situated on the dashboard and for which the pilot must look away from the outside environment to read the displayed information.

To display the images superimposed on the view of the outside environment, head up display devices most often used head up collimators. These collimators generally comprise an image source, a collimator lens that infinitely returns the images generated by the source, and a combiner passed through by the radiation coming from the outside environment and the rays transmitted by the collimator lens. In the collimators, the image source is for example a cathode tube monochromatic display.

Head up display devices thus allow the pilot to see the displayed information while continuing to observe the outside environment. Furthermore, head up display devices make it possible to display information that enriches the view of the outside environment by the pilot, such as markers showing certain elements of the outside environment.

SUMMARY OF THE INVENTION

However, head up display devices onboard recent aircraft have the drawback of a multiplication of the displayed information, distracting the pilot and preventing him from quickly paying attention to the displayed critical information, or even preventing him from noticing critical information that is displayed.

One aim of the invention is to better draw the pilot's attention to the critical information shown to him.

To that end, a piloting assistance device of the aforementioned type is provided, in which the management unit is capable of commanding the display, for at least one of the piloting information images, of an animation intended to attract a user's attention to that piloting information image, the animation comprising the display of an alert image and the shrinkage of the alert image.

According to specific embodiments of the invention, the piloting assistance device also comprises one or more of the following features, considered alone or according to any technically possible combination(s):

- the alert image covers, at least at one moment of the animation, more than 50%, preferably more than 75% of the display surface;
- the alert image is in the shape of a box;
- at the beginning of the animation, the alert image is centered on a center of the display surface;
- the animation suitable for being displayed comprises centering of the alert image on the piloting information image;
- the animation suitable for being displayed comprises, after the shrinkage and centering of the alert image, a jump of the alert image, including:
  - a magnification of the alert image, the magnification advantageously not exceeding 20%, preferably 10%, of the size of the alert image before the magnification, then
  - a new shrinkage of the alert image, to substantially the same size as before the magnification;
- the animation suitable for being displayed comprises the appearance of the piloting assistance information;
- the animation suitable for being displayed comprises a magnification of the piloting information image;
- at the end of the animation suitable for being displayed, the piloting information image is displayed in a central area of the display surface;
- the piloting information image is related to an event requiring a reaction from the pilot within less than one second;
- at the end of the animation suitable for being displayed, the piloting information image is displayed in a peripheral area of the display surface;
- the animation suitable for being displayed comprises a movement of the piloting information image from a central area of the display surface to the peripheral area;
- at the end of the animation suitable for being displayed, the alert image covers less than 30% of the display surface;
- the device comprises a head up collimator to which the display surface and the display management unit belong, the view of an outside landscape being a view of the outside landscape through the display surface;
- the animation ends with the disappearance of the alert image;
- the animation lasts less than 4 seconds, preferably less than 3 seconds;
- the animation suitable for being displayed comprises a disappearance of the alert image;
- the management unit is capable of commanding the display, for at least a first of the piloting information images, located in a central area of the display surface, of a first animation to draw a user's attention to the first piloting information image, the first animation comprising the display of an alert image, a shrinkage of the alert image, and a magnification of the first piloting information image, and the management unit is capable of commanding the display, for at least a second of the piloting information images, located in a peripheral area of the display surface, of a second animation to draw a user's attention to the second piloting information image, the second animation comprising the display of an alert image, a shrinkage of the alert image, a centering of the alert image on the second piloting information image, and, after the shrinkage and centering, a jump of the alert image, the jump comprising a magnification of the alert image, the magnification not exceeding 20%, preferably 10%, of the size of the alert image before the magnification, then a new shrinkage of the alert image to substantially the same size as before the magnification; and the view of the outside landscape is a view of the outside landscape through the piloting assistance device.

The invention also relates to a method for assisting with the piloting of a vehicle, in particular an aircraft, by displaying images on a display surface showing the images superimposed on a view of an outside landscape, the method comprising a step for displaying piloting information on the display surface, characterized in that the method comprises the following additional steps:

displaying an alert image on the display surface, and shrinking the alert image.

According to one particular embodiment of the invention, the view of the outside landscape is a view of the outside landscape through the display surface.

BRIEF DESCRIPTION OF THE DRAWINGS

Other features and advantages of the invention will appear upon reading the following description, provided solely as an example and done in reference to the appended drawings, in which.

DETAILED DESCRIPTION

Figure 1:
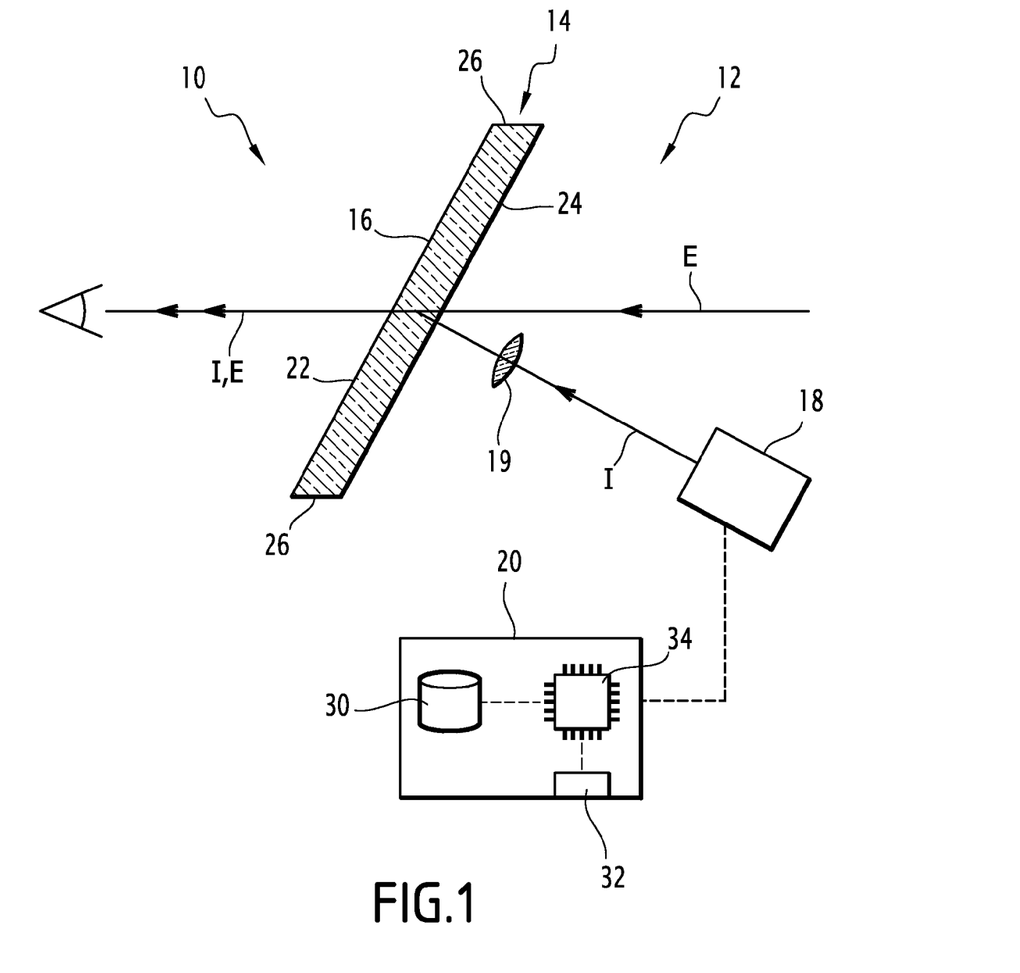
FIG. 1 is a diagrammatic view of a piloting assistance device according to an embodiment of the invention.

The piloting assistance device 10 shown in FIG. 1 is a head up display device. It equips an aircraft (not shown). Alternatively, it equips an aircraft pilot helmet.

The piloting assistance device 10 comprises a head up collimator 12.

The head up collimator 12 comprises a strip 14 made from transparent material, for example glass, defining a display surface 16. It further comprises an image source 18 for displaying images on the display surface 16, a collimator lens 19 for modifying a bundle I of rays from the source 18 such that the rays of the bundle are oriented substantially parallel to one another after crossing through the collimator lens 19, and a display management unit 20 for controlling the source 18.

In a known manner, the strip 14 forms a combiner, suitable for a bundle E of rays from the outside environment of the aircraft to cross through the strip 14 without being deflected, and for the bundle I of rays from the source 18 to be reoriented so as to be parallel to the bundle E after crossing through the strip 14. Thus, the images generated by the source 18 and displayed on the surface 16 are virtual images localized to infinity, shown superimposed with a view of the outside environment of the aircraft through the strip 14.

Optionally, the collimator lens 19 is integrated into the strip 14.

The strip 14 has two opposite large faces 22, 24, connected to each other by an edge 26. It is arranged such that one 22 of the large faces 22, 24 is oriented toward the inside of the cockpit, the opposite face 24 being oriented toward the outside of the cockpit.

The display surface 16 is formed by the large face 22 of the strip 14. It is delimited at its periphery by the edge 26.

Figure 2:
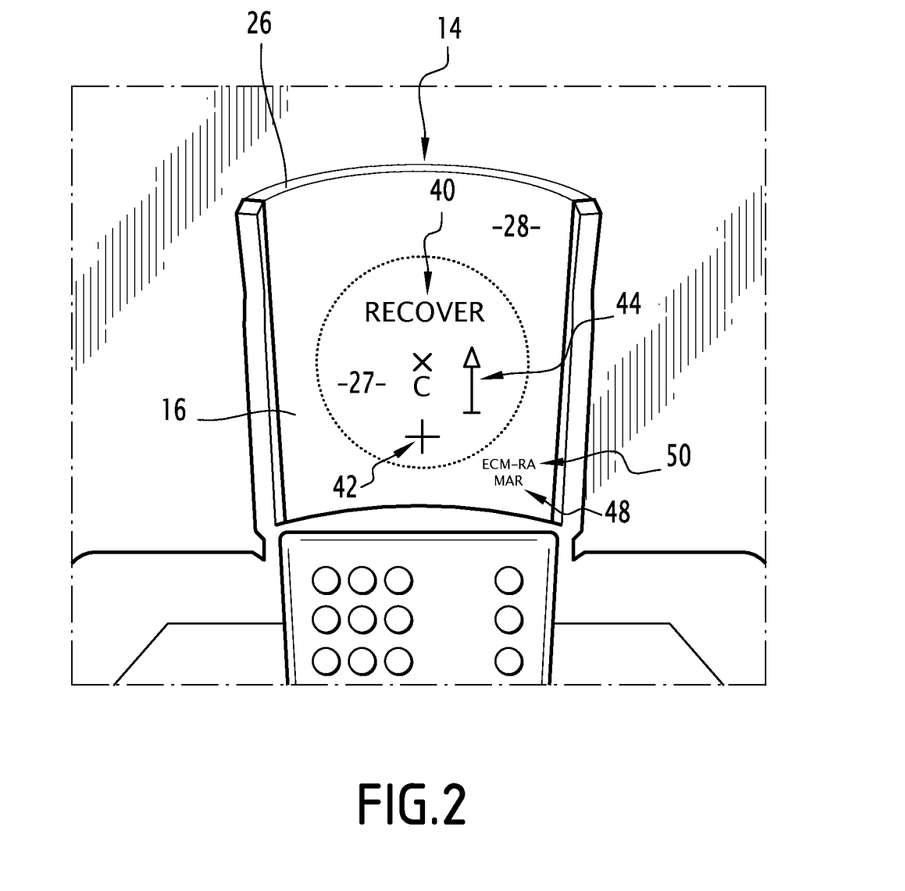
FIG. 2 is a diagrammatic view of a display surface of the device of FIG. 1, a plurality of piloting information images being displayed on the surface.

In reference to FIG. 2, the display surface 16 comprises a center C, a central area 27 centered on the center C, and a peripheral area 28, extending between the central area 27 and the edge 26. The central area 27 in particular occupies more than 50% of the display surface 16.

Returning to FIG. 1, the source 18 is a cathode tube monochromatic display (commonly called CRT, Cathode Ray Tube) making it possible to display the information in green.

Alternatively, the cathode ray tube display is replaced by a liquid crystal display making it possible to display the information in at least two different colors.

The display management unit 20 comprises a memory 30 storing multiple piloting information images to be displayed on the display surface 16, a module 32 for communicating with equipment of the aircraft, and a computer 34 programmed to command the source 18 so as to display the piloting information images on the display surface 16 as a function of signals received by the communication module 32.

In reference to FIG. 2, the piloting information images for example comprise an information image 40 on loss of control of the aircraft, an information image 42 on an imminent collision, an information image 44 on a ground collision, an information image 48 on a minimum clearance distance, and an information image 50 regarding lighting of the aircraft.

The images 40, 42, 44 are designed to be displayed in the central area 27. The images 48, 50 are designed to be displayed in the peripheral area 28.

The computer 34 is programmed to display the image 40 when the communication module 32 receives a signal indicating that the pilot is about to enter an unauthorized flight envelope, in which the ratio of the speed of the aircraft to its angle of attack is too low. "About to" means that the event is likely to occur within approximately one second. This image 40 is generally called "RECOVER alert".

The computer 34 is programmed to display the image 42 when the communication module 32 receives a signal indicating that the aircraft is passing below 70% of a minimum flight altitude previously set by the pilot, or indicating that the aircraft risks being impacted by the explosion sphere of a bomb having exploded if no action is taken. This image 42 is generally called "TBA clearance alert" or "clearance cross".

The computer 34 is programmed to display the image 44 when the communication module 32 receives a signal indicating that the aircraft is at a height below a threshold height. This image 44 is generally called "anti-ground collision sweep".

The computer 34 is programmed to display the image 48 when the communication module 32 receives a signal indicating that the aircraft is about to enter a zone in which it may be hit by a missile. This image 48 is generally called "MAR alert", which stands for "Minimum Abort Range".

The computer 32 is programmed to display the image 50 when the communication module 34 receives a signal indicating that the aircraft is lit by a missile guidance ray. This image is generally called "SPECTRA alert".

The images 40, 42, 44 are all related to events (collision or loss of control risks) requiring a reaction from the pilot within less than one second.

The images 48 and 50 are displayed in the peripheral zone 28 because they relate to information that is critical, but requires less reaction urgency from the pilot, even though it must be brought to the pilot's attention quickly. These alerts are shown in amber on polychromatic piloting assistance devices with a head down display.

The piloting information images also comprise other images which, for clarity reasons, are not shown in the Figures. These other images in particular comprise information images on risks compromising flight safety, commonly called "red alerts" because these alerts are displayed in red on certain polychromatic aircraft devices, such as head down display piloting assistance devices. The computer 34 is programmed to display these red alerts in the central zone 27. These red alerts in particular comprise the "LEFT ENGINE FIRE" and "RIGHT ENGINE FIRE" labels, which the computer 34 is programmed to display when the communication module 32 receives a signal indicating that the left or right engine, respectively, is on fire.

It is essential for the pilot's attention to be able to be drawn to the piloting information images quickly when they are displayed. To that end, the memory 30 stores multiple animations to be displayed on the display surface 16, and the computer 34 is programmed to command the source 18 so as to display the animations on the display surface 16 as a function of signals received by the communication module 32.

Figure 3:
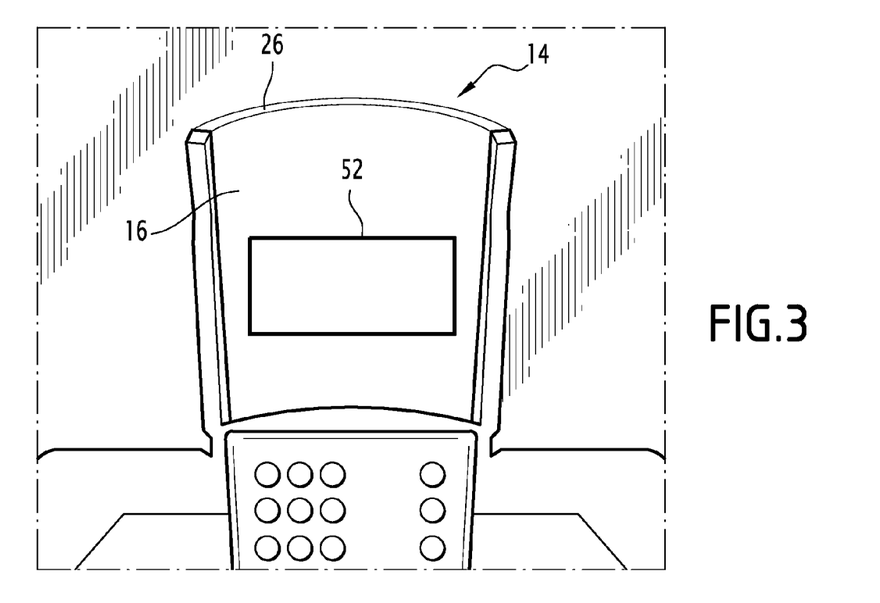
FIG. 3 is a view similar to FIG. 2, a first part of a first animation being displayed.
Figure 4:
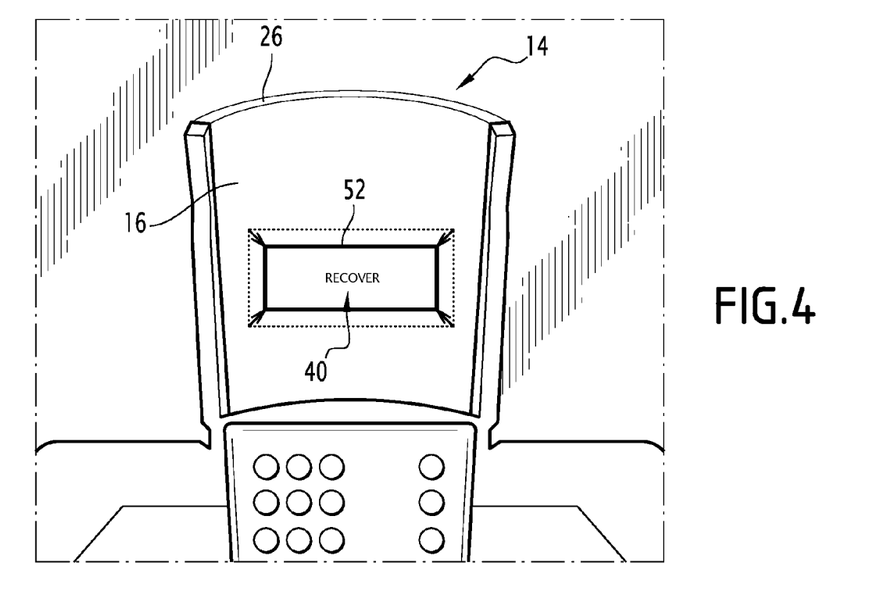
FIG. 4 is a view similar to FIG. 2, a second part of the first animation being displayed.
Figure 5:
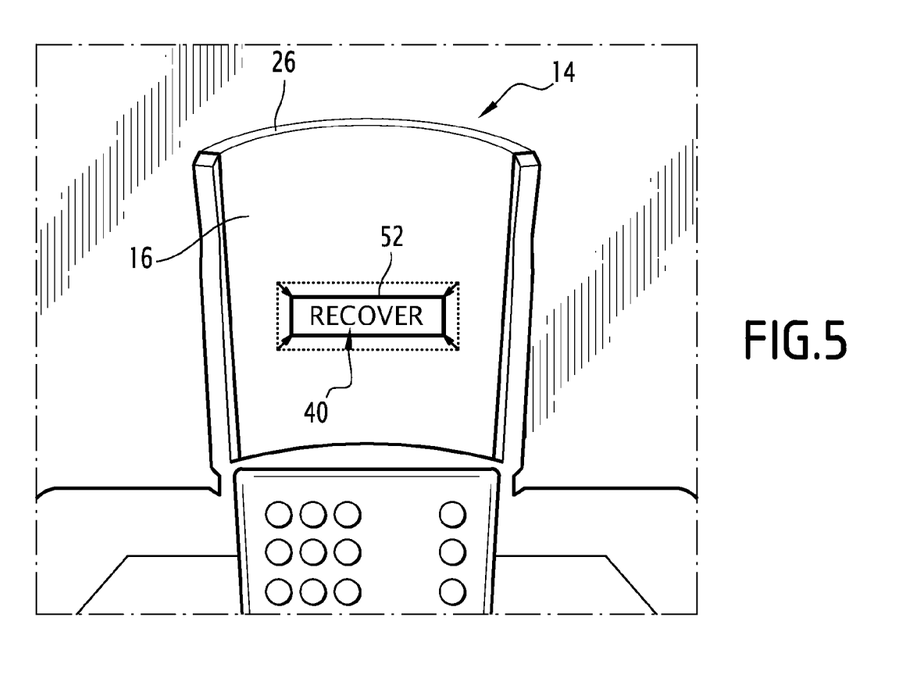
FIG. 5 is a view similar to FIG. 2, a third part of the first animation being displayed.
Figure 6:
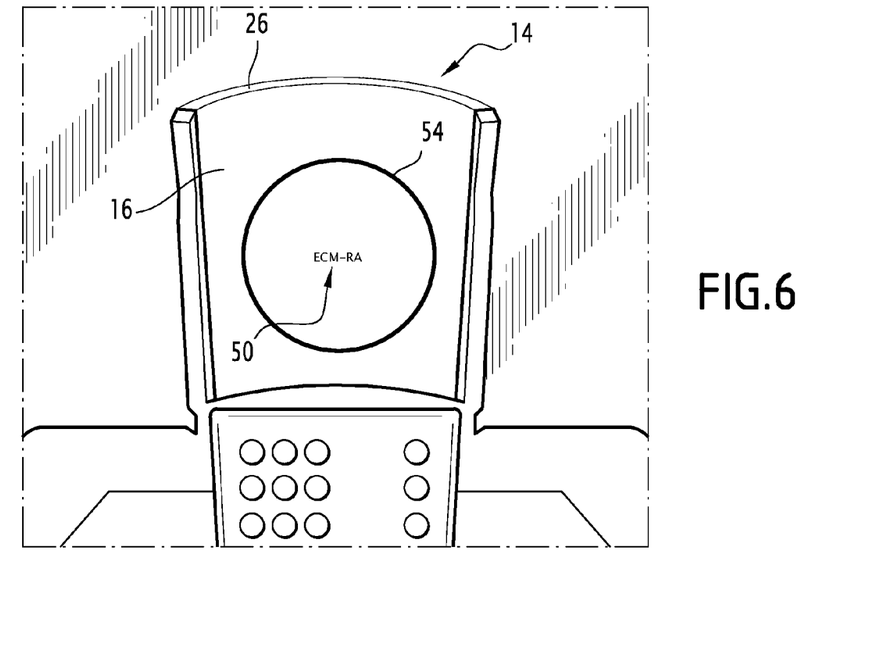
FIG. 6 is a view similar to FIG. 2, a first part of a second animation being displayed.
Figure 7:
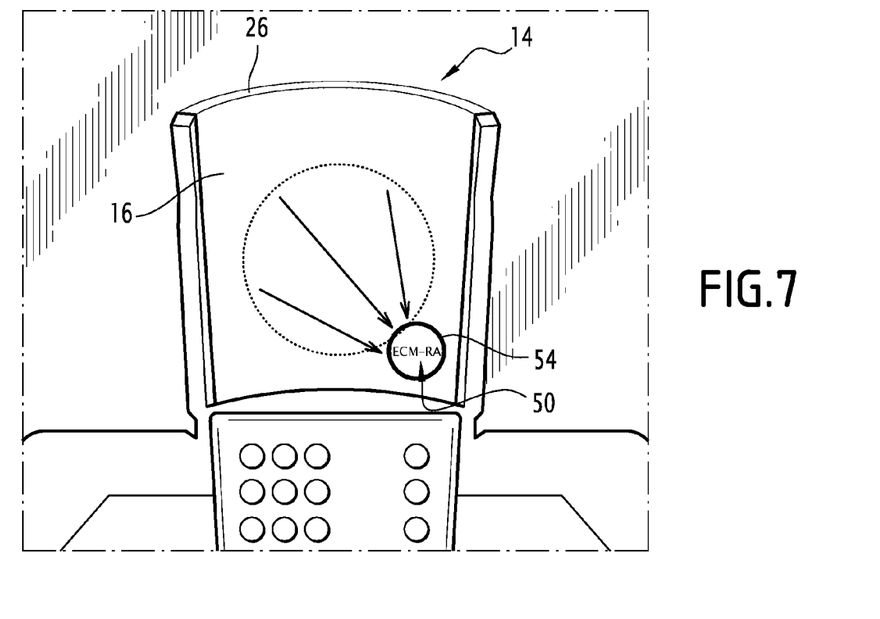
FIG. 7 is a view similar to FIG. 2, a second part of the second animation being displayed.

Each animation is associated with a piloting information image, and is designed to draw the pilot's attention to the piloting information image. In particular, a first animation, shown in FIGS. 3 to 5, is associated with the image 40, and a second animation, shown in FIGS. 6 to 10, is associated with the image 50.

In reference to FIGS. 3, 4, 6 and 7, each animation comprises an appearance of the piloting information image, in the illustrated examples the images 40, 50, a display of an alert image 52, 54 centered on the center C of the display surface 16, the alert image 52, 54 covering more than 50%, preferably more than 75%, of the display surface 16, a narrowing of the alert image 52, 54, and a centering of the alert image 52, 54 on the piloting information image.

As shown, the appearance of the piloting information image is preferably located in the central area 27.

In the event of a polychromatic display, the alert image 52, 54 is preferably green. The human brain being more sensitive to green than to red, using this color makes it possible to accelerate the perception of the display of the alert image 52, 54 by the pilot.

The alert image 52, 54 is preferably a box. In particular, the alert image 52 of the first animation is a rectangular box, and the alert image 54 of the second animation is a circular box.

It will be noted that the area of the display surface 16 that is framed by the box will be described as "covered by the alert image 52, 54". Thus, the proposition "the alert image 52, 54 covers x % of the display surface 16" should be interpreted as "the alert image 52, 54 surrounds x % of the display surface 16".

The shrinkage of the alert image 52, 54 reduces the size of the alert image 52, 54 from its initial size when it is displayed to a final size at the end of the shrinkage. The final size of the alert image 52, 54 is such that the alert image 52, 54 covers less than 30% of the display surface 16.

The shrinkage is advantageously continuous. In other words, the size of the alert image 52, 54 decreases continuously from its initial size to its final size during the shrinkage, without any stage during which the size of the alert image 52, 54 varies abruptly.

The shrinkage advantageously lasts less than 2 seconds, and preferably more than 0.2 seconds.

In reference to FIGS. 4 and 5, the first animation additionally comprises a magnification of the piloting information image 40. This magnification increases the size of the piloting information image 40 from a substantially zero size when it appears to a normal display size of the piloting information image at the end of the animation.

The magnification is advantageously continuous. In other words, the size of the piloting information image 40 increases continuously from its original size to its normal size during the magnification, without any stage during which the size of the piloting information image 40 varies abruptly.

The normal size is such that the piloting information image 40 does not protrude outside the alert image 52 when the alert image 52 has reached its final size.

The first animation also comprises simultaneous blinking of the alert image 52 and the piloting information image 40 at the end of the animation. This blinking is adapted to last as long as the alert is active.

Optionally, the first animation also comprises a change in shape of the alert image 52, prior to its blinking.

Alternatively, to replace the blinking of the alert image 52, the first animation comprises a disappearance of the alert image 52. This disappearance is adapted to occur while the piloting information image 40 remains displayed. This disappearance of the alert image 52 typically consists of dimming of the alert image 52.

The second animation does not comprise a magnification of the piloting information image 50. In reference to FIGS. 6 to 10, it does, however, comprise a movement of the piloting information image 50 from the central area 27 to the peripheral area 28, and a jump of the alert image 54, after shrinkage and centering of the alert image 54.

Figure 8:
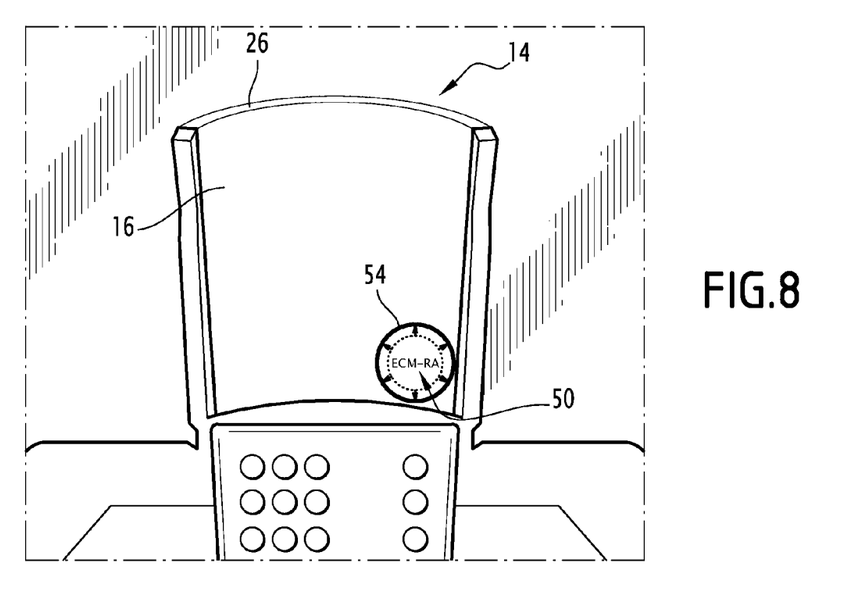
FIG. 8 is a view similar to FIG. 2, a third part of the second animation being displayed.
Figure 9:
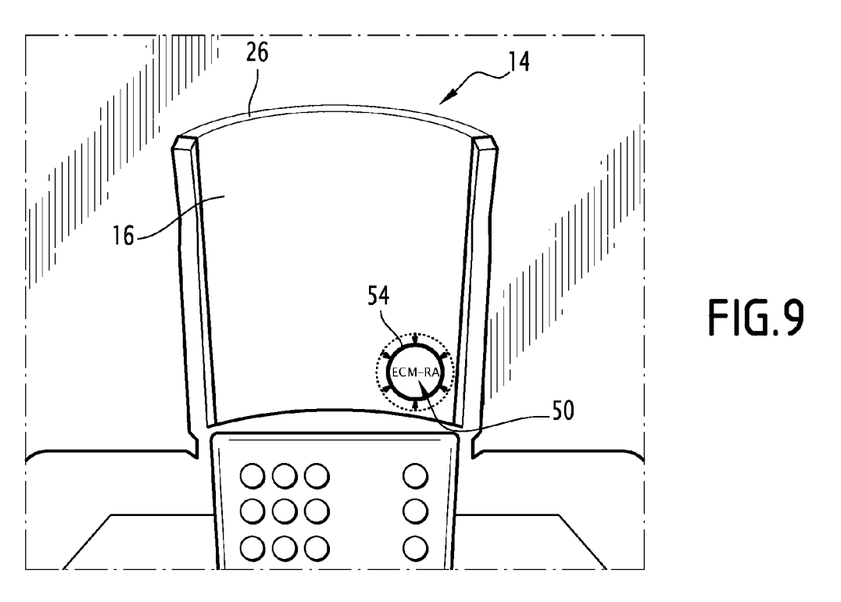
FIG. 9 is a view similar to FIG. 2, a fourth part of the second animation being displayed.

As shown in FIGS. 8 and 9, the jump of the alert image 54 includes a magnification of the alert image, the magnification advantageously not exceeding 20%, preferably 10%, of the size of the alert image 54 before the magnification, then a new shrinkage of the alert image 54, to substantially the same size as before the magnification.

Advantageously, the magnification and the new shrinkage are each continuous.

The jump preferably lasts less than 2 seconds, and preferably more than 1 second.

Figure 10:
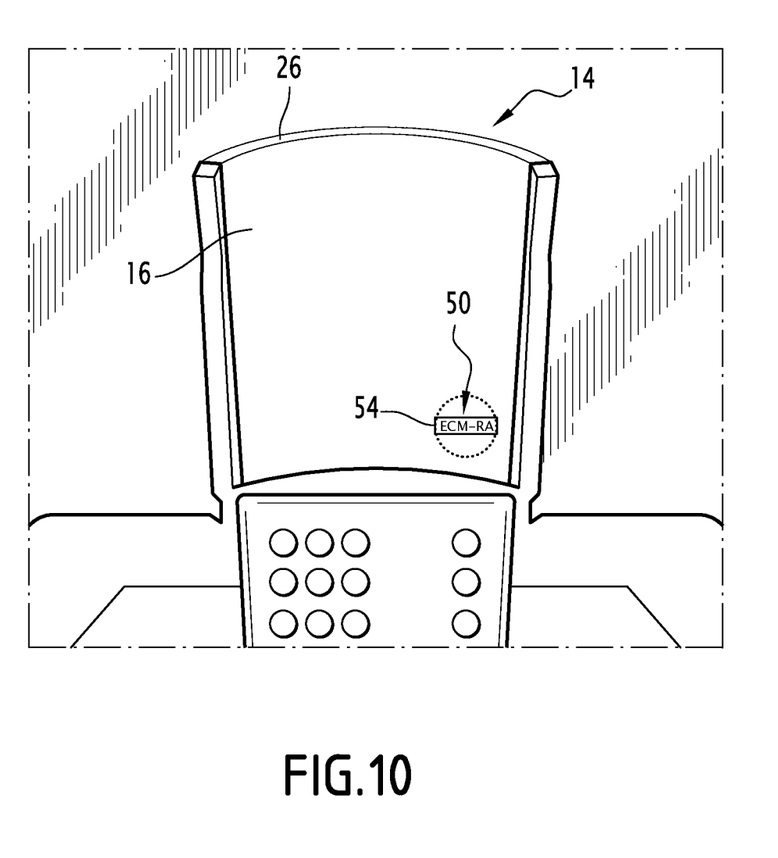
FIG. 10 is a view similar to FIG. 2, a fifth part of the second animation being displayed.

The second animation also comprises a shape change of the alert image 54, as shown for example in FIG. 10. This shape change follows the jump.

Optionally, following the shape change, the second animation also comprises blinking of the alert image 54, while the piloting information image 50 remains displayed, optionally with blinking of the piloting information image 50 simultaneously with the blinking of the alert image 54.

Alternatively, to replace the shape change and blinking of the alert image 54, the second animation comprises a disappearance of the alert image 54. This disappearance is adapted to occur while the piloting information image 50 remains displayed. This disappearance of the alert image 54 typically consists of dimming of the alert image 54.

Other animations are also associated with the images 42 and 44, as well as with the information images on risks compromising flight safety. The description of the first animation is applicable to each of the other animations, the reference to "the piloting information image 40" simply needing to be replaced by a reference to "the piloting information image 42", "the piloting information image 44" or "the information image on risks compromising flight safety".

In general, the description of the first animation is applicable to each animation associated with a piloting information image which, at the end of the animation, is displayed in the central area 27.

Another animation is also associated with the image 48. The description of the second animation is applicable to this other information, the reference to "the piloting information image 50" simply needing to be replaced by a reference to "the piloting information image 48".

In general, the description of the second animation is applicable to each animation associated with a piloting information image which, at the end of the animation, is displayed in the peripheral area 28.

The computer 34 is programmed not to repeat any of the animations without a new signal received by the communication module 32. This avoids cognitive overload for the pilot.

Figure 11:
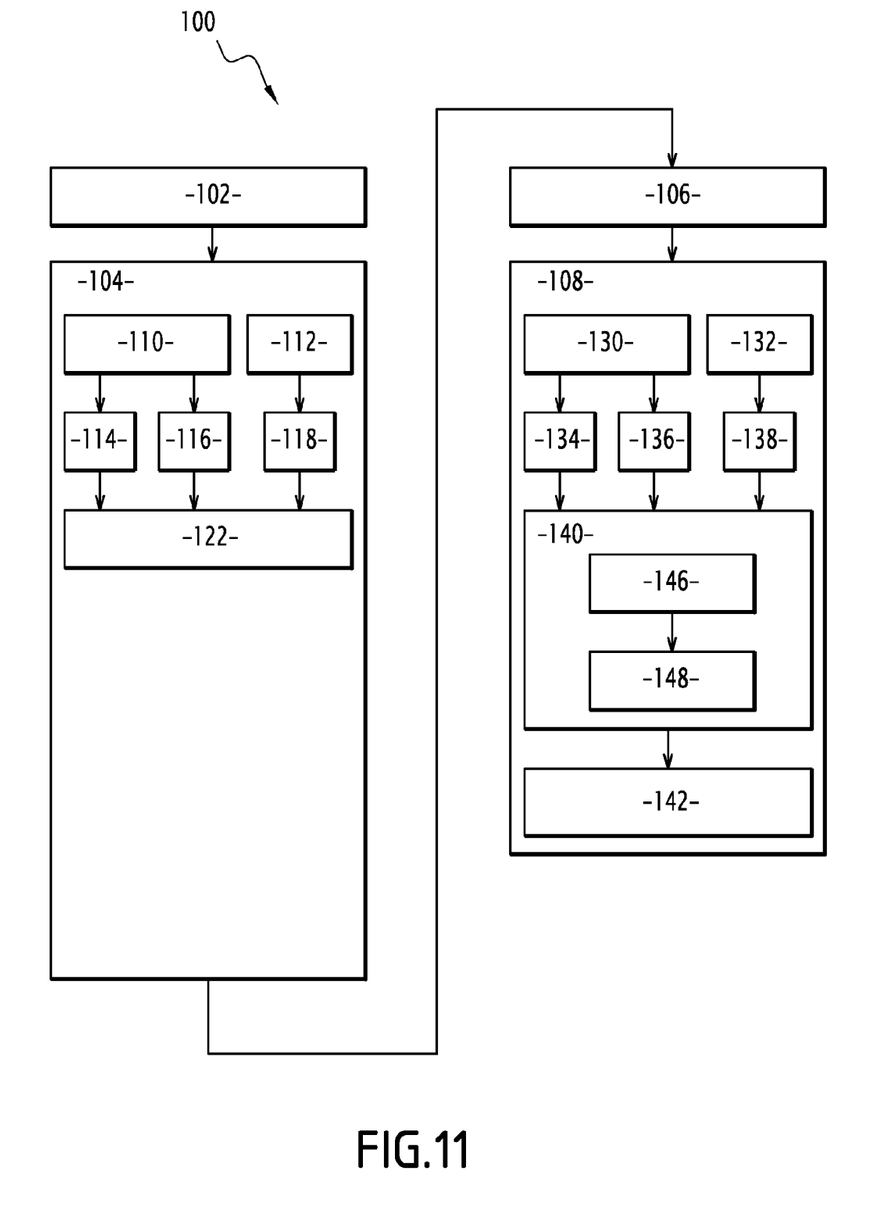
FIG. 11 is a block diagram illustrating a method implemented by the device of FIG. 1.

A method 100 for assisting with piloting implemented by the assistance device 10 will now be described, in reference to FIG. 11.

The method 100 comprises a first step 102 for receiving a first signal by the communication module 32, a second step 104 for displaying the first animation, a third step 106 for receiving a second signal by the communication module 32, and fourth step 108 for displaying the second animation.

During the first step 102, the communication module 32 receives a signal indicating that the pilot is about to enter an unauthorized flight envelope. The computer 34 then selects the first animation in the memory 30, and commands the display of the first animation by the image source 18.

The second step 104 follows the first step 102, and comprises the following sub-steps:
- display 110 of the alert image 52,
- appearance 112 of the piloting information image 40,
- shrinkage 114 of the alert image 52,
- centering 116 of the alert image 52 on the piloting information image 40,
- magnification 118 of the piloting information image 40, and
- simultaneous blinking 122 of the alert 52 and piloting information 40 images.

During the display step 110, the alert image 52 is displayed on the display surface 16, the alert image 52 covering more than 50%, preferably more than 75%, of the display surface 16. The alert image 52 is then centered on the center C of the display surface 16.

The appearance step 112 is substantially complementary to the display step 110. During this step 112, the piloting information image 40 is displayed, the image 40 having a substantially zero original size. The image 40 is positioned in the central area 27 of the display surface 16.

The shrinkage step 114 follows the display step 110. During this step 114, the size of the alert image 52 continuously decreases from the initial size to a final size in which the alert image 52 covers less than 30% of the display surface 16. The shrinkage step 114 advantageously lasts less than 2 seconds, and preferably more than 0.2 seconds.

The centering step 116 is substantially complementary to the narrowing step 114. During this step 116, the alert image 52 becomes centered on the piloting information image 40.

The magnification step 118 follows the appearance step 112 and is substantially complementary to the narrowing 114 and centering 116 steps. During this step 118, the size of the image 40 increases continuously from its original size to a normal display size of the image 40. The normal size is such that the piloting information image 40 does not protrude outside the alert image 52 when the alert image 52 has reached its final size.

The blinking step 122 follow steps 114, 116 and 118. During this step 122, the alert 52 and piloting information 40 images blink. The piloting information image 40 is at its normal size and is located in the central area 27, and the alert image 52 is at its final size and is centered on the image 40.

During the blinking step 122, the alert 52 and piloting information 40 images blink. These images remain displayed while blinking as long as the alert is active. They next disappear instantaneously when the alert is complete, for example when the pilot has performed an action necessary to deactivate the alert, or when the aircraft has been placed in a position in which the alert does not need to be active, for example through a return of the aircraft to the authorized flight envelope.

In the illustrated example, the third step 106 follows the second step 104. Alternatively, the third step 106 occurs before the first step 102, or concomitantly with the second step 104.

During the third step 106, the communication module 32 receives a signal indicating that the aircraft is lit by a missile guidance ray. The computer 34 then selects the second animation in the memory 30, and commands the display of the second animation by the image source 18.

The fourth step 108 follows the third step 106, and comprises the following sub-steps:
- display 130 of the alert image 54,
- appearance 132 of the piloting information image 50,
- shrinkage 134 of the alert image 54,
- centering 136 of the alert image 54 on the piloting information image 50,
- movement 138 of the piloting information image 50, and
- jump 140 of the alert image 54, and
- shape change 142 of the alert image 54.

During the display step 130, the alert image 54 is displayed on the display surface 16, the alert image 54 covering more than 50%, preferably more than 75%, of the display surface 16. The alert image 54 is then centered on the center C of the display surface 16.

The appearance step 132 is substantially complementary to the display step 130. During this step 132, the piloting information image 50 is displayed, the image 50 having a normal display size. The image 50 is then positioned in the central area 27 of the display surface 16.

The shrinkage step 134 follows the display step 130. During this step 134, the size of the alert image 54 decreases continuously from the initial size to a final size in which the alert image 54 covers less than 30% of the display surface 16. The shrinkage step 134 advantageously lasts less than 2 seconds, and preferably more than 0.2 seconds.

The centering step 136 is substantially concomitant with the shrinking step 134. During this step 136, the alert image 54 becomes centered on the piloting information image 50.

The movement step 138 is substantially concomitant with the shrinkage 134 and centering 136 steps. During this step 138, the piloting information image 50 moves continuously from its initial position in the central area 27 to a final position in the peripheral area 28.

The jump step 140 follows steps 134, 136, 138, such that, at the beginning of the jump step 140, the piloting information image 50 is positioned in the peripheral area 28, and the alert image 54 is centered on the image 50, while being at its final size.

During the jump step 140, the alert image 54 remains centered on the piloting information image 50. The jump step 140 comprises the following sub-steps:

magnification 146 of the alert image 54, then new shrinkage 148 of the alert image 54.

During the magnification step 146, the size of the alert image 54 increases, until it reaches an intermediate size. The intermediate size is advantageously less than 120%, preferably less than 110%, of the final size of the alert image 54.

During the new shrinkage step 148, the size of the alert image 54 decreases until it returns to the final size.

The jump step 140 advantageously lasts less than 2 seconds, and preferably more than 1 second.

The shape changing step 142 follows the jump step 140. During that step, the alert image 54 changes shape, going from its circular box shape to a rectangular box shape.

The alert 54 and piloting information 50 images next remain displayed, immobile, as long as the alert is active. The piloting information image 50 is at its normal size and is located in the peripheral area 28, and the alert image 54 is at its final size and is centered on the image 50. These images 50, 54 disappear instantaneously when the alert is complete.

Owing to embodiments of the invention, the pilot's eye is quickly drawn to the piloting information associated with the animation, even when the pilot is not in the process of observing the environment through the display surface 16. In fact, the off-centered part of the retina is particularly capable of perceiving movements, and the eye has an orientation reflex that causes it to become spontaneously oriented toward a perceived movement.

Furthermore, the alert image covering a large part of the display surface during the animation, the detection of the movement by the eye is facilitated.

Thus, embodiments of the invention make it possible to draw the pilot's gaze toward the piloting information associated with the displayed animation less than 0.4 seconds after the beginning of the display of the animation.

It will be noted that, for clarity reasons, the views of the display surface 16 shown in FIGS. 2 to 10 have been simplified so as only to show the piloting information images 40, 42, 44, 48, 50 and alert images 52, 54. The display surface 16 normally shows other piloting information that has not been shown here so as to avoid overloading the Figures.

What is claimed is:

1. A piloting assistance device for assisting in the piloting of a vehicle comprising:
   a surface displaying images;
   a display management unit for managing images designed to be displayed on the display surface superimposed on a view of the outside landscape, the display management unit being configured to command the display of piloting information images on the display surface,
   the display management unit being configured to command the display, for at least one of the piloting information images, of an animation designed to attract a user's attention to the at least one piloting information image, the animation being specific to the at least one piloting information image, and including a display of an alert image different from the at least one piloting information image, a shrinkage of the alert image, and a centering of the shrunk alert image on the at least one piloting information image,
   wherein the alert image covers, at least at one moment of the animation, more than 50% of the display surface.

2. The piloting assistance device as recited in claim 1 wherein the alert image covers, at least at one moment of the animation, more than 75% of the display surface.

3. The piloting assistance device as recited in claim 1 wherein the alert image is in the shape of a frame.

4. The piloting assistance device as recited in claim 1 wherein at the beginning of the animation, the alert image is centered on a center of the display surface.

5. The piloting assistance device as recited in claim 1 wherein the animation includes, after the shrinkage and centering of the alert image, a jump of the alert image, including:
   a magnification of the alert image, the magnification advantageously not exceeding 20%, preferably 10%, of the size of the alert image before the magnification, then
   a new shrinkage of the alert image, to substantially a same size as before the magnification.

6. The piloting assistance device as recited in claim 1 wherein the animation includes the appearance of the at least one piloting information image.

7. The piloting assistance device as recited in claim 1 wherein the animation includes a magnification of the at least one piloting information image.

8. The piloting assistance device as recited in claim 1 wherein at the end of the animation, the at least one piloting information image is displayed in a central area of the display surface.

9. The piloting assistance device as recited in claim 1 wherein the at least one piloting information image is related to an event requiring a reaction from the pilot within less than one second.

10. The piloting assistance device as recited in claim 1 wherein at the end of the animation, the at least one piloting information image is displayed in a peripheral area of the display surface.

11. The piloting assistance device as recited in claim 10 wherein the animation includes a movement of the at least one piloting information image from a central area of the display surface to the peripheral area.

12. The piloting assistance device according to claim 1, wherein at the end of the animation, the alert image covers less than 30% of the display surface.

13. The piloting assistance device as recited in claim 1 further comprising a head up collimator including the display surface and the display management unit, the view of an outside landscape being a view of the outside landscape through the display surface.

14. The piloting assistance device as recited in claim 1 wherein the vehicle is an aircraft.

15. A method for assisting with the piloting of a vehicle comprising:
   displaying images on a display surface showing the images superimposed on a view of an outside landscape;
   displaying piloting information on the display surface;
   displaying an alert image on the display surface, the alert image being different from the at least one piloting information image and being specific to the at least one piloting information image;
   shrinking the alert image; and
   centering the shrunk alert image on the at least one piloting information image,
   wherein the alert image covers, at least at one moment, more than 50% of the display surface.

16. The method as recited in claim 15 wherein the vehicle is an aircraft.

\* \* \* \* \*